United States Patent [19]
LaRose et al.

[11] Patent Number: 5,954,907
[45] Date of Patent: *Sep. 21, 1999

[54] PROCESS USING ELECTROSTATIC SPRAYING FOR COATING SUBSTRATES WITH RELEASE COATING COMPOSITIONS, PRESSURE SENSITIVE ADHESIVES, AND COMBINATIONS THEREOF

[75] Inventors: Joseph A. LaRose, Ravenna; Jeffrey J. DeMange, Eastlake; Tamara L. McCartney, Stow; Robert J. Takacs, Chardon, all of Ohio

[73] Assignee: Avery Dennison Corporation, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/946,402

[22] Filed: Oct. 7, 1997

[51] Int. Cl.⁶ .................................................. B32B 31/00
[52] U.S. Cl. .................................. 156/275.5; 156/275.7; 156/289; 156/307.3; 156/308.2; 156/309.9; 156/310; 156/324.4; 427/208.4; 427/208.8; 427/385.5; 427/387; 427/407.1; 427/421; 427/475; 427/480; 427/482; 427/485; 427/503; 427/505; 427/515; 427/516; 427/551; 427/558; 427/559; 427/595
[58] Field of Search .................................... 427/475, 480, 427/482, 485, 503, 505, 515, 516, 551, 558, 559, 595, 208.4, 208.8, 385.5, 387, 407.1, 421; 156/275.5, 275.7, 289, 307.3, 308.2, 309.9, 310, 324.4

[56] References Cited

U.S. PATENT DOCUMENTS 1,958,406  5/1934  Darrah .
2,893,894  7/1959  Ransburg .
3,025,213  3/1962  Copeland .

(List continued on next page.)

FOREIGN PATENT DOCUMENTS 0 195 041  8/1985  European Pat. Off. .
WO 86/01745  3/1986  WIPO .

OTHER PUBLICATIONS

DeVilbiss Ransburg, Industrial Liquid Systems, "Aerobell Atomizer Bells" (1992) )(No month avail.).
"The Electrohydrodynamic Atomization of Liquids", IEEE Transactions on Industry Applications, David P. H. Smith, vol. IA–22, No. 3, May/Jun. 1986, 9 pages.
"Modeling of Electrostatic Spray Plumes", Michael A. True, IEEE Transactions on Industry Applications, vol. IA–19, No. 5, Sep./Oct., 1983, pp. 754–758.
"Molecular Beams of Macroions", Malcolm Dole, L. L. Mack, R. L. Hines, R. C. Mobley, L. D. Ferguson and M. B. Alice, The Journal of Chemical Physics, vol. 49, No. 5, Sep. 1, 1968, pp. 2240–2249.
"Molecular Beams of Macroions. II", L. L. Mack, P. Kralik, A. Rheude and M. Dole, The Journal of Chemical Physics, vol. 52, No. 10, May 15, 1970, pp. 4977–4986.

(List continued on next page.)

Primary Examiner—Bernard Pianalto
Attorney, Agent, or Firm—Renner, Otto, Boisselle & Sklar

[57] ABSTRACT

This invention relates to a process for applying a coating material comprising a release coating composition or a pressure sensitive adhesive composition to a substrate, the process comprising: (A) atomizing and electrically charging said coating material; and (B) spraying the atomized and charged coating material from step (A) on to a substrate which overlies a grounded support structure. In one embodiment, the coating material sprayed during step (B) is a release coating composition, said process further comprising the additional steps of: (C) curing said release coating composition; (D) atomizing and electrically charging a pressure sensitive adhesive composition; (E) spraying the pressure sensitive adhesive composition from step (D) on to said substrate over the cured release coating composition from step (C); and (F) placing another substrate over the sprayed pressure sensitive adhesive composition from step (E).

11 Claims, 1 Drawing Sheet

U.S. PATENT DOCUMENTS

| | | |
|---|---|---|
| 3,052,213 | 9/1962 | Schaffert . |
| 3,060,429 | 10/1962 | Winston . |
| 3,157,819 | 11/1964 | Krohn, Jr. . |
| 3,503,704 | 3/1970 | Marks . |
| 3,596,275 | 7/1971 | Sweet . |
| 3,717,722 | 2/1973 | Messner . |
| 3,776,187 | 12/1973 | Probst . |
| 3,810,874 | 5/1974 | Mitsch et al. . |
| 3,911,448 | 10/1975 | Ohno et al. . |
| 4,209,696 | 6/1980 | Fite . |
| 4,264,641 | 4/1981 | Mahoney et al. . |
| 4,333,086 | 6/1982 | Ebi . |
| 4,356,528 | 10/1982 | Coffee . |
| 4,381,342 | 4/1983 | Van Heyningen . |
| 4,404,573 | 9/1983 | Kocot et al. . |
| 4,476,515 | 10/1984 | Coffee . |
| 4,525,566 | 6/1985 | Homan et al. ............................. 528/17 |
| 4,530,882 | 7/1985 | Homan et al. .......................... 428/452 |
| 4,743,470 | 5/1988 | Nachtkamp et al. ................... 427/246 |
| 4,748,043 | 5/1988 | Seaver et al. . |
| 4,882,107 | 11/1989 | Cavender et al. ........................ 264/51 |
| 4,934,603 | 6/1990 | Lasley ..................................... 239/527 |
| 5,096,761 | 3/1992 | Roberts et al. . |
| 5,110,618 | 5/1992 | Faust . |
| 5,162,969 | 11/1992 | Leung . |
| 5,178,646 | 1/1993 | Barber, Jr. et al. . |
| 5,223,226 | 6/1993 | Wittmer et al. . |
| 5,236,471 | 8/1993 | Van Dijen . |
| 5,246,036 | 9/1993 | Gurowitz . |
| 5,264,036 | 11/1993 | Haas et al. . |
| 5,308,887 | 5/1994 | Ko et al. . |
| 5,326,598 | 7/1994 | Seaver et al. . |
| 5,334,676 | 8/1994 | Anderson et al. . |
| 5,340,897 | 8/1994 | Loiselle et al. ........................... 528/17 |
| 5,344,676 | 9/1994 | Kim et al. . |
| 5,444,466 | 8/1995 | Smyczek et al. . |
| 5,464,659 | 11/1995 | Melancon et al. . |
| 5,486,219 | 1/1996 | Ford et al. . |
| 5,505,995 | 4/1996 | Leonard . |
| 5,506,000 | 4/1996 | Leonard . |
| 5,514,730 | 5/1996 | Mazurek et al. . |
| 5,525,376 | 6/1996 | Leonard . |
| 5,527,578 | 6/1996 | Mazurek et al. . |

OTHER PUBLICATIONS

"Electrical Characterization of a Charged Workpiece Grounded–Sprayer Electrostatic Painting System", Alaa A. Elmoursi and Carlton E. Speck, IEEE Transactions on Industry Applications, vol. 27, No. 2, Mar./Apr. 1991, pp. 311–315.

"Formation of Uniformly Sized Liquid Droplets Using Spinning Disk Under Applied Electrostatic Field", Masayuki Sato, IEEE Transactions on Industry Applications, vol. 27, No. 2, Mar./Apr. 1991, pp. 316–322.

"Electrostatic Atomization of Conducting Liquids Using AC Superimposed on DC Fields", W. Balachandran, W. Machowski and C N. Ahmad, IEEE Transactions on Industry Applications, vol. 30, No. 4, Jul./Aug. 1994, pp. 850–855.

"Electrostatic Coating Technologies", Designers and Manufacturers of Electrostatic Coating Equipment, 4 pages. (no date avail.).

"Comprehensive Studies of Electrohydrodynamic Spraying of Liquids", N. V. Krasnov and S. I. Shevchenko, 1995 American Institute of Physics, reV. Sci. Instrum. 66 (6), Jun. 1995, pp. 3623–3626.

"Droplet Diameter, Flux, and Total Current Measurements in an Electrohydrodynamic Spray", P. F. Dunn and S. R. Snarski, J. Appl. Phys., vol. 71, No. 1, Jan. 1, 1992, pp. 80–84.

It's All in the Charge, "Understanding Electrostatic Finishing", Frank Robinson and Dennis Stephens, The DeVilbiss Co., Toledo, Ohio, 2 pages. (No date avail.).

ITW Ransburg Electrostatic Systems, "Electrostatic Disk Application Circuit", 19 pages.

ITW Ransburg Electrostatic Systems, Training & Development, "Electrostatic Limitations Faraday Cage Effects", Apr. 1989 Rev. TL–00–02.1, 3 pages.

ITW Ransburg Electrostatic Systems, "Field Test Equipment", Oct. 1984 Rev. TE–84–01.1, 9 pages.

PROCESS USING ELECTROSTATIC SPRAYING FOR COATING SUBSTRATES WITH RELEASE COATING COMPOSITIONS, PRESSURE SENSITIVE ADHESIVES, AND COMBINATIONS THEREOF

TECHNICAL FIELD

This invention relates to a process for applying release coating compositions, pressure sensitive adhesives and combinations thereof to substrates using electrostatic spraying.

BACKGROUND OF THE INVENTION

Release coating compositions and pressure sensitive adhesives are used in making pressure sensitive products such as labels, decals, tapes, and the like. The release coating composition is adhered to a paper or film substrate which is used as a release backing sheet (sometimes referred to as a protective release sheet or a release liner). The pressure sensitive adhesive is adhered to the release coating. Another paper or film substrate (sometimes referred to as a facestock) overlies the pressure sensitive adhesive. The combination of the release coating, adhesive and two substrates forms the pressure sensitive product. The pressure sensitive adhesive adheres to the release coated surface of the release backing sheet sufficiently to enable the pressure sensitive product to be handled prior to use. When the product is used, the release backing sheet is pulled off and discarded. The exposed pressure-sensitive adhesive is pressed onto a surface where the pressure sensitive product is to be placed.

The prior art techniques for applying these release coating compositions and pressure sensitive adhesives to the substrates generally involve contact coating techniques. A contact coating technique is one in which the applicator is in contact or in substantial contact with the substrate as the release coating composition or adhesive is applied. Examples of such contact coating techniques include gravure, reverse gravure, offset gravure, roller coating, brushing, knife-over roll, metering rod, reverse roll coating, doctor knife, dipping and die coating. While many of these contact coating techniques are meritorious, there are inherent problems associated with their use including the formation of wrinkles, streaks, voids and other coating defects. A non-contact coating technique, on the other hand, is one in which the applicator does not contact the substrate as the coating material is applied. An example of such a non-contact coating technique is conventional spraying. There are problems associated with conventional spraying, however, including poor deposition efficiencies and overspraying. The present invention, which involves the use of electrostatic spraying, overcomes these problems.

SUMMARY OF THE INVENTION

This invention relates to a process for applying a coating material to a substrate, said coating material comprising a release coating composition or a pressure sensitive adhesive composition, said process comprising: (A) atomizing and electrically charging said coating material; and (B) spraying the atomized and charged coating material from step (A) on to a substrate which overlies a grounded support structure. In one embodiment, the coating material sprayed during step (B) is a release coating composition, said process further comprising the additional steps of: (C) curing said release coating composition; (D) atomizing and electrically charging a pressure sensitive adhesive composition; (E) spraying the pressure sensitive adhesive composition from step (D) on to said substrate over the cured release coating composition from step (C); and (F) placing another substrate over the sprayed pressure sensitive adhesive composition from step (E).

BRIEF DESCRIPTION OF THE DRAWINGS

In the annexed drawings, like references indicate like parts or features.

DESCRIPTION OF THE PREFERRED EMBODIMENTS

Figure 1:
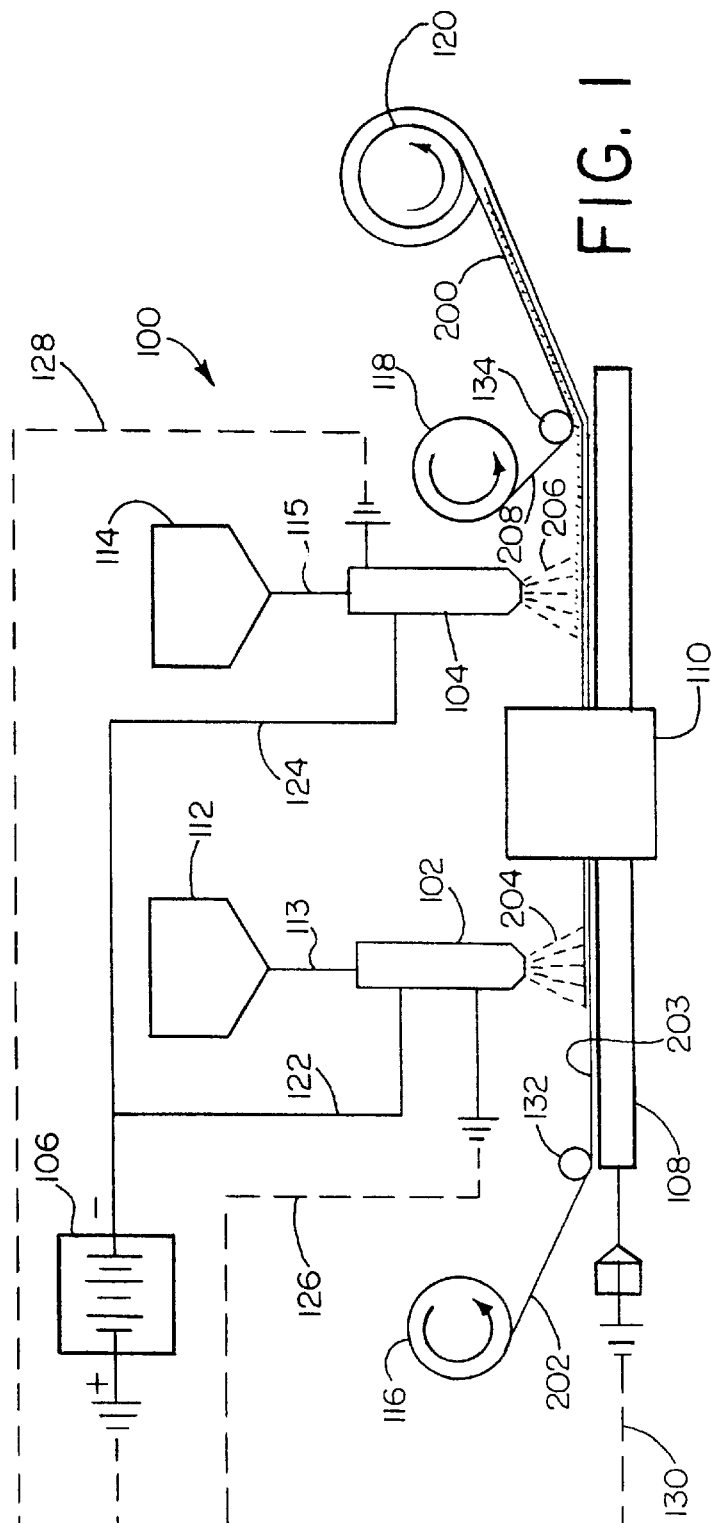
FIG. 1 is a flow sheet illustrating the process of the present invention in a particular form.

The coating material that is electrostatically sprayed in accordance with the inventive process can be either a release coating composition or a pressure sensitive adhesive composition. The coating material is atomized and electrically charged during the inventive process using standard electrostatic spraying techniques. In one embodiment, the atomized particles have an average diameter in the range of 40 to about 500 microns, and in one embodiment about 50 to about 500 microns, and in one embodiment about 80 to about 300 microns, and in one embodiment about 80 to about 140 microns. Atomization and electrical charging can be effected using an Aerobell atomizer produced by ITW Ransberg Industrial Liquid Systems. The electrically charged and atomized particles are sprayed onto a substrate which overlies a grounded support structure. The substrate can be comprised of paper, polymer film or a combination thereof. The grounded support structure can be a flat surface (e.g., a grounded plate) or moving conveyor. The sprayed particles are attracted to the grounded support structure by a charge differential. The voltage is generally in the range of about 40 to about 100 kV, and in one embodiment about 70 to about 90 kV. The gap between the spray apparatus and the grounded support structure is generally in the range of about 4 to about 12 inches, and in one embodiment about 6 to about 8 inches.

The release coating composition that can be used with the inventive process can be any release coating composition known in the art. These include moisture curable compositions, thermally curable compositions, and radiation curable compositions.

Silicone release coating compositions are particularly useful. The major components of such silicone release coating compositions are polyorganosiloxanes and, in one embodiment, polydimethylsiloxanes. The silicone release coating compositions used in this invention may be moisture cured, thermally cured, or radiation cured. Generally, the moisture curable and thermally curable compositions comprise at least one polyorganosiloxane and at least one catalyst (or curing agent) for such polyorganosiloxane(s). Such compositions may also contain at least one cure accelerator and/or adhesivity promoter (sometimes referred to as an anchorage additive). As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such multifunctional additives where appropriate is within the purview of the invention.

A wide variety of polyorganosiloxanes, which are sometimes referred to as silicones, can be used in the practice of the invention. Such polyorganosiloxanes are also sometimes referred to as polymeric silicone resins, rubbers, oils or fluids. These compositions are well known and fully described in the literature. These compositions are comprised essentially of silicon atoms connected to each other by oxygen atoms through silicon oxygen linkages, e.g.,

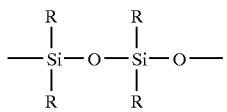

wherein each R is an organic group, generally an alkyl group. The compositions used in the practice of the invention include polymers and copolymers having molecular weights in the range of about 5,000 to about 250,000. These polymers and copolymers should not have obtained such a degree of polymerization or condensation that they are no longer soluble in common hydrocarbon solvents such as xylene, toluene, methyl ethyl ketone, and carbon tetrachloride. In general, any organic solvent having a boiling point equal to or less than that of xylene can be used in the compositions used in the practice of the invention. The solvent merely serves as a convenient vehicle or carrier for uniform application to the substrate. Thus, higher boiling solvents can be used but require so much time for their control that their use is not commercially economical. Various polyorganosiloxanes are commercially available in organic solvents in various percent solids concentration. Exemplary of the polyorganosiloxane materials which can be used in forming the silicone release coating compositions of the invention are those disclosed in U.S. Pat. Nos. 2,258,218; 2,258,220; 2,258,222; 2,494,920; 3,432,333; and 3,518,325.

Suitable catalysts which can be employed in the curing of the silicone release compositions include various compounds containing metals such as tin, lead, platinum, rhodium, etc. Generally, the catalysts are tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide, and others well known in the art as curing agents or catalysts for polyorganosiloxane (silicone) materials. Useful catalysts include the carboxylic acid salts of organotin compounds containing at least one carbontin bond such as those previously mentioned. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. Amine salts of carboxylic acids can also be used. In one embodiment, the catalyst is a platinum metal complex.

The cure accelerators and/or adhesivity promoters which can be used in the silicone release coating compositions are also well known in the art. Exemplary of such cure accelerators and/or adhesivity promoters are amines, amine-functional silanes and amine precursors previously discussed as well as other silane derivatives such as acetoxy-functional silanes of the type vinyl

and orthosilicates such as tetra(diethylene glycol monomethyl ether) silane. Orthosilicates which have been found to be advantageous include ethylene glycol derivatives having the formula $Si[(OC_2H_4)_2OR]_4$, wherein R is alkyl or alkenyl radical having up to 8 carbon atoms, e.g., methyl, ethyl, isopropyl, butyl, octyl, vinyl, allyl, etc., and $Si(OCH_2H_4OR^1)_4$ wherein $R^1$ is an alkyl or alkenyl radical having up to 8 carbon atoms, e.g., methyl, propyl, butyl, pentyl, hexyl, allyl, pentenyl, etc. Isocyanate compounds which have been found to be effective in the practice of the invention include any isocyanate which is soluble in organic solvents and which has an average of at least two isocyanate groups per molecule. Such isocyanates can be monomeric or polymeric in nature, e.g., the isocyanate can be a partially hydrolyzed toluene diisocyanate. In other words, a urea or polyurea which still retains isocyanate groups in the molecules or a polybiuret containing unreacted isocyanate groups are typical of the isocyanate compound which can be used in the practice of the invention. Other such isocyanates include the reaction products of an isocyanate with a polyhydroxyl compound (i.e., a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group.

At least some of these compounds also function as curing catalysts per se as well as cure accelerators and/or adhesivity promoters. The amount of curing agent or catalyst, cure accelerator and/or adhesivity promoter employed in the silicone release coatings of the invention can be varied widely depending upon the curing temperature, the particular catalyst used, the particular polyorganosiloxane materials selected, the particular cure accelerator and/or adhesivity promoter used, the substrate, desired curing time, etc. Usually the amount of any of such components will be in the range of 0.5 to 20 weight percent of the silicone material employed.

Curing of the polyorganosiloxane coating material can take place at room temperature depending upon the particular silicone material used and the particular curing agent or catalyst used in conjunction with said silicone material. To avoid premature curing of silicones, the selected catalyst is typically hindered with molecules that act as inhibitors. At elevated temperatures these inhibitors disassociate from the catalyst thereby initiating the silicone cure reaction. However, for practical continuous operations the time required for curing at room temperature is generally too long. Most curing agents or catalysts are capable of promoting relatively rapid curing at moderate elevated temperatures. This temperature at which relatively rapid curing takes place is sometimes referred to as the curing initiating temperature even though curing will take place at room temperature. Polyorganosiloxanes that cure in the temperature range of about 70° C. to about 180° C. can be used. Non-inhibited systems (i.e., systems not containing an inhibitor) can be used with the present invention and cured at or near ambient temperatures. The choice of temperature actually employed in the curing steps will depend upon a number of factors such as the type of silicone coating material used, the curing catalyst used with said silicone material, and the rate at which the coated substrate is passed through the heating zone.

The radiation-curable silicone release compositions that are useful can be cured by ultraviolet or electron beam radiation with or without the assistance of a photoinitiator such as benzophenone. One type of polyorganosiloxane which is useful in preparing radiation-curable release coatings contains acryloxy groups, methacryloxy groups, or combinations thereof. A variety of acryloxy or methacryloxy containing polyorganosiloxanes are known and can be used. These polyorganosiloxanes are typically fluids which have viscosities in the range of from about 25 cps to 10,000 cps. Polyorganosiloxanes of this type are described in U.S. Pat. Nos. 3,878,263; 4,064,286; 4,301,268; 4,306,050; 4,908,274; 4,963,438; 4,978,726; and 5,034,491 which are hereby incorporated by reference for their disclosure of acrylate or methacrylate containing polyorganosiloxanes and methods of preparing polyorganosiloxanes containing acryloxy and/or methacryloxy groups.

Polyorganosiloxanes containing acryloxy and/or methacryloxy groups are available commercially from, for example, Goldschmidt Chemical Corp., Hopewell, Va. Goldschmidt's silicone acrylate series include polydimethylsiloxanes available under the general trade designation Tergo® RC, and more particularly, under designations such as RC 450, RC 450N, RC 706, RC 707, RC 710, RC 720 and RC 726. Some of these polyorganosiloxanes are of the type prepared by the reaction of acrylic acid or methacrylic acid with polydimethylsiloxane containing hydroxyl groups or epoxy groups.

The radiation-curable release compositions that are useful with the present invention optionally may contain at least one photoinitiator. The amount of photoinitiator included in the release compositions may range from about 0% to about 10%, more often from about 0.5% to about 5% based on the total weight of the radiation-curable composition. A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The silicone release compositions that are useful can be in the form of solutions in organic solvents or emulsions in water, or they can be in neat form (solventless) when the silicone composition is a liquid. These release compositions are electrostatically sprayed on to a substrate which overlies a grounded support structure until a coat weight is achieved that is generally in the range of about 0.1 to about 1000 gsm, and in one embodiment about 0.1 to about 500 gsm, and in one embodiment about 0.1 to about 250 gsm, and in one embodiment about 0.1 to about 100 gsm, and in one embodiment about 0.2 to about 50 gsm. In one embodiment, the coat weight is in the range of about 0.2 to about 14 gsm. In one embodiment, the coat weight is in the range of about 0.9 to about 1.5 gsm. In one embodiment, the coat weight is in the range of about 0.8 to about 28 gsm. In one embodiment, the thickness or caliper of the resulting release-coated substrate may range from about 4 to about 10 mils, and in one embodiment about 4 or 4.5 to about 6 mils.

In one embodiment, two or more release coating layers are sprayed, one on top of another. In this embodiment, it is convenient to use a separate spray head for each release coating material being sprayed.

The pressure-sensitive adhesive materials that can be used include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering*, Vol. 1, pages 476–546, Interscience Publishers, 2nd Ed. 1985, the disclosure of which is hereby incorporated by reference. The pressure sensitive adhesive materials that are useful can be in the form of solutions or emulsions, or they can be in the form of hot melt adhesives. The pressure sensitive adhesives may contain as a major constituent an adhesive polymer such as natural, reclaimed or styrene butadiene rubber, tackified natural or synthetic rubbers, styrene butadiene or styrene isoprene block copolymers, random copolymers of ethylene and vinyl acetate, ethylene-vinyl-acrylic terpolymers, polyisobutylene, poly(vinyl ether), poly (acrylic) ester, etc. The pressure sensitive adhesive materials are typically characterized by glass transition temperatures in the range of about $-70°$ C. to about $10°$ C.

The acrylic adhesives may contain as a major constituent acrylic type polymers containing carboxylic acids which are obtained from vinyl type monomers containing carboxyl groups such as acrylic acid, methacrylic acid, etc., and acrylic type polymers containing hydroxyl groups which are obtained from vinyl type monomers containing hydroxyl groups such as 2-hydroxyethyl methacrylate, etc. In one embodiment, the acrylic adhesive material is obtained from the copolymerization of an alkyl acrylate such as butyl acrylate, 2-ethylhexyl acrylate, or isononyl acrylate; a polar monomer such as acrylic acid, acrylamide, or N-vinyl-2-pyrrolidone, and another monomer such as an acrylate other than the acrylate mentioned above, methacrylate, styrene, vinyl acetate, etc.

Block copolymers which may be employed include thermoplastic block copolymers having linear, radial or star configurations and having the A blocks and B blocks formed into what are generally termed as ABA block copolymers. In one embodiment, the A block is a monoalkenyl arene, mainly polystyrene, having a molecular weight between about 4,000 and about 50,000, and in one embodiment between about 7,000 and about 30,000. Other suitable A blocks may be formed from alpha-methyl styrene, t-butyl styrene and other ring alkylated styrenes as well as mixtures thereof. The A block content is from about 10% to about 50%, and in one embodiment between about 10% and about 30%. B is an elastomeric conjugated diene such as butadiene or isoprene having an average molecular weight of from about 5,000 to about 500,000, and in one embodiment from about 50,000 to 200,000. In one embodiment, ABA triblock and AB diblock copolymers comprise the majority of the block copolymer elastomer of the adhesive, the percent diblock being less than about 95% of the block copolymer, and in one embodiment less than about 85%, and in one embodiment less than about 75%. Other conventional diene elastomers may be used to a minor extent, but not so as to significantly affect the adhesion properties.

Specific examples of ABA-type copolymers of styrene and isoprene are Kraton 1107 and Kraton 1117 from Shell Chemical Company. ABA-type copolymers of styrene-butadiene are available from Firestone under the designations Steron 840A and 845A. Other commercially available copolymer adhesives include: random copolymer of ethylene and vinyl acetate having a melt-flow index of 2500 in a vinyl acetate content of 14% by weight (Escorene MVO-2514) available from Exxon Chemical; styrene butadiene block synthetic rubber having a styrene content of 30% by weight (Finaprene 411) available from Fina Chemical Company; random copolymer of ethylene and vinyl acetate having a melt-flow index of 148 and a vinyl acetate content of 18.5% by weight (Elvax 420) available from DuPont; and random copolymer of ethylene and vinyl acetate having a melt-flow index of 57 and a vinyl acetate content of 40% by weight of an Elvax 40 W.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers).

The tackifying resins include those aliphatic hydrocarbon resins made from the polymerization of a feed stream consisting mainly of unsaturated species containing 4 to 6 carbon atoms; rosin esters and rosin acids; mixed aliphatic/aromatic tackifying resins; polyterpene tackifiers; and hydrogenated tackifying resins. The hydrogenated resins can include resins made from the polymerization and subsequent hydrogenation of a feedstock consisting mostly of dicyclopentadiene; resins produced from the polymerization and subsequent hydrogenation of pure aromatic feedstocks such as styrene, alpha-methyl styrene, vinyl toluene; resins fashioned from the polymerization and subsequent hydrogenation of an unsaturated aromatic feedstream wherein the feedstream mainly contains species having from about 7 to about 10 carbon atoms; hydrogenated polyterpene resins; and hydrogenated aliphatic and aliphatic/aromatic resins. The use of a mixture of tackifying resins can provide adhesive materials with a balance of high peel adhesion values and shear adhesion values with good initial tack. Useful tackifying resins include the aliphatic hydrocarbon resins and the hydrogenated resins. Specific examples include rosin acids, rosin esters, styrenated terpene resins, oil-soluble phenolics, and polyterpenes. Commercially available tackifying resins include Escorez 1310 from Exxon Chemical Co., Wingtack Plus, Wingtack 10 and Wingtack 95 available from Goodyear Chemical Co., Hercolyn D from Hercules, Inc., and Zonarez A-25 from Arizona Chemical Co. The tackifying resin component may comprise about 5% to about 60% by weight of the pressure sensitive adhesive material, and in one embodiment about 10% to about 40% by weight.

The following rubber based adhesives can be used:

PSA-1: A rubber-resin hot melt general purpose permanent pressure sensitive adhesive having a density of 7.88 lb/gal and a viscosity of 7000–11000 cps @ 350° F.

PSA-2: A rubber-resin hot melt permanent pressure sensitive adhesive for dairy label applications having a density of 8.25 lb/gal and a viscosity of 4500–7500 cps @ 350° F.

PSA-3: A rubber-resin hot melt general purpose permanent pressure sensitive adhesive having a density of 7.8 lb/gal and a viscosity of 14,000–19,000 cps @ 350° F.

PSA-4: A permanent rubber-based emulsion adhesive having a typical service temperature in the range of about −65° F. to about 200° F. This is an aggressive general purpose adhesive.

The following acrylic adhesives can be used:

PSA-5: Acrylic emulsion pressure sensitive adhesive having a solids content of 60% by weight and a pH of 5.2.

PSA-6: A permanent tackified acrylic emulsion pressure sensitive adhesive having a solids content of 58.5% by weight and a pH of 7.2.

PSA-7: A removable acrylic emulsion pressure sensitive adhesive having a solids content of 61% by weight and a pH of 6.5.

PSA-8: A removable acrylic emulsion pressure sensitive adhesive having a solids content of 52% by weight and a pH of 9.2.

PSA-9: A removable acrylic emulsion pressure sensitive adhesive having a solids content of 40% by weight and a pH of 6.6.

PSA-10: A repulpable acrylic emulsion pressure sensitive adhesive having a solids content of 60% by weight.

PSA-11: An acrylic emulsion adhesive having a typical service temperature range of about −65° F. to about 200° F. This adhesive is a permanent adhesive at cold and room temperature conditions after 24 hours. This adhesive is semi-removable when first applied.

Commercially available acrylic adhesives that can be used include Narcor 38-4542 (a product of National Starch identified as a removable acrylic emulsion pressure sensitive adhesive), E2920 (a product of Rohm & Haas identified as an acrylic emulsion pressure sensitive adhesive), and Aroset 2555 (a product of Ashland identified as an ultra removable acrylic emulsion pressure sensitive adhesive).

Examples of commercially available pressure sensitive silicone adhesives include PSA825-D1, PSA518-D1 and PSA6574-D1, which are available from GE Silicones.

The coating weight of the pressure sensitive adhesive composition that is electrostatically sprayed on to the substrate (or on to a previously applied release coating layer) is generally in the range of about 0.1 to about 1000 gsm, and in one embodiment about 0.1 to about 500 gsm, and in one embodiment about 0.5 to about 250 gsm, and in one embodiment about 1 to about 100 gsm, and in one embodiment about 1 to about 50 gsm, and in one embodiment about 2 to about 28 gsm.

In one embodiment, two or more layers of adhesive are sprayed, one on top of another. In this embodiment, it is convenient to use a separate spray head for each adhesive material being sprayed.

The substrates used in the inventive process may comprise paper, polymer film, or a combination thereof. During the electrostatic spraying step(s) of the inventive process the substrate is placed in a position overlying a grounded support structure such as a flat surface or a moving conveyor. The substrate can be the facestock for a label or the liner sheet of a release liner. If the substrate is a release coated liner being sprayed with an adhesive, the liner can be coated with the release coating composition in accordance with the inventive process, or it can be pre-coated with a release coating composition using known techniques.

Paper substrates are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the substrate. Thus, any type of paper can be used depending upon the end use and particular personal preferences. Included among the types of paper which can be used are clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and in one embodiment about 60 to about 100 pounds per ream are useful. The term "ream" as used herein equals 3000 square feet. Examples of specific papers that can be used include 41-pound offset grade bleached Kraft; 78-pound bleached Kraft paper, etc.

Alternatively, the substrate may be a polymer film, and examples of polymer films include polyolefin, polyester, polyvinyl chloride, polyvinyl fluoride (PVF), polyvinylidene difluoride (PVDF), etc., and combinations thereof. The polyolefin films may comprise polymer and copolymers of monoolefins having from 2 to about 12 carbon atoms, and in one embodiment from 2 to about 8 carbon atoms, and in one embodiment 2 to about 4 carbon atoms per molecule. Examples of such homopolymers include polyethylene, polypropylene, poly-1-butene, etc. The examples of copolymers within the above definition include copolymers of ethylene with from about 1% to about 10% by weight of propylene, copolymers of propylene with about 1% to about 10% by weight of ethylene or 1-butene, etc. Films prepared from blends of copolymers or blends of copolymers with homopolymers also are useful. The polymer films may be extruded in mono or multilayers.

Another type of material which can be used as the substrate is a polycoated kraft liner which is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the substrate. The weights of these substrates typically range from about 30 to about 100 pounds per ream, and in one embodiment about 40 to about 94 pounds per ream. In total, the final substrate is typically comprised of between about 10% and about 40% polymer and from about 60% to about 90% paper. For two sided coatings, the quantity of polymer is approximately evenly divided between the top and bottom surface of the paper.

In one embodiment, multi-layer articles are made by this process which are comprised of laminates or pressure sensitive products comprising (a) a first substrate; (b) a second substrate; (c) a layer of a release coating composition which has been cured; and (d) a layer comprising a pressure-sensitive adhesive composition, wherein the release layer (c) is interposed between the first substrate and the layer of pressure-sensitive adhesive and is preferentially adherent to the first substrate, and the pressure-sensitive adhesive layer (d) is interposed between the release layer and the second substrate and is preferentially adherent to the second substrate. Additional layers can be interdispersed between the first substrate and the layer of pressure-sensitive adhesive and between the second substrate and the release layer using conventional techniques to provide additional desirable properties such as increased strength, increased dimensional stability, etc.

Referring to FIG. 1, a process, depicted generally by the reference numeral 100, is disclosed for making a multi-layer article 200. The multi-layer article 200 is a pressure-sensitive product that can be used as a pressure sensitive label, decal, tape, etc. The process 100 requires the use of electrostatic sprayers 102 and 104, power source 106, grounded support structure 108, curing apparatus 110, holding tanks 112 and 114, pay-out reels 116 and 118, and take-up reel 120. The power source 106 is electrically connected to the electrostatic sprayers 102 and 104 through power lines 122 and 124, respectively. The power source 106 is also connected to electrostatic sprayers 102 and 104 through ground lines 126 and 128, respectively. The power source 106 is connected to grounded support structure 108 through ground line 130.

In operation, a release coating composition is stored in tank 112 and advanced to electrostatic sprayer 102 through line 113. In electrostatic sprayer 102, the release coating composition is atomized and an electrostatic charge is placed on the atomized particles.

A pressure sensitive adhesive composition is stored in tank 114 and advanced to electrostatic sprayer 104 through line 115. In electrostatic sprayer 104, the pressure sensitive adhesive composition is atomized and an electrostatic charge is placed on the atomized particles.

A first substrate material 202, which can be comprised of paper, polymer film or a combination thereof is advanced from pay-out reel 116 under guideroller 132 on to and in contact with grounded support structure 108. Substrate 102 advances from left to right along support structure 108 to a position under electrostatic sprayer 102. The movement of the substrate 202 is continuous and as it passes under electrostatic sprayer 102, atomized and electrically charged release coating composition 204 is sprayed onto the surface 203 of substrate 202. The substrate 202, with sprayed release coating composition 204 on its surface, is advanced to and through curing apparatus 110. The release coating composition 204 is cured within curing apparatus 110 with the result being the formation of a cured release coating layer on the surface 203 of substrate 202. When the release coating composition is a thermally curable release coating composition, the curing apparatus 110 can be a curing oven or other suitable thermal apparatus of conventional design. The curing apparatus 110 can be a radiation curing unit of conventional design when the release coating composition is a radiation curable release coating composition. The curing apparatus 110 is not required when the release coating composition is a moisture curable release coating composition; moisture in the ambient air is generally sufficient to effect the desired cure. The substrate 202 with the cured release coating 204 adhered to its surface, is advanced from curing apparatus 110 to a position under electrostatic sprayer 104. As the coated substrate passes under electrostatic sprayer 104, atomized pressure sensitive adhesive composition 206 is sprayed on to the cured release coating composition layer 204. The adhesive is dried. The resulting laminate, with sprayed adhesive 206 overlying the layer of cured release coating composition 204, is advanced to a position under guideroller 134 wherein the laminate comes into contact with a second substrate 208 which is advanced to guideroller 134 from pay-out reel 118. The second substrate 208 contacts and adheres to the sprayed adhesive 206 with the result being the formation of the multi-layer article 200 which is collected on take-up reel 120.

Figure 2:
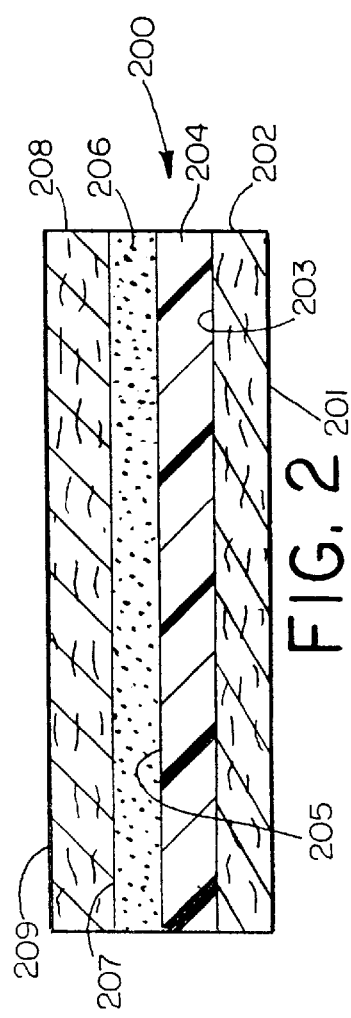
FIG. 2 is a schematic illustration of the side view of a laminate made in accordance with the inventive method, the laminate having pressure sensitive adhesive composition adhered to the surface of one substrate and a release coating composition adhered to the surface of another substrate, the substrates overlying one another with the adhesive layer in contact with the release coating.

Referring to FIG. 2, the laminate structure 200 is comprised of a first substrate 202 having a surface 203 and a layer of a cured release coating composition 204 overlying and adhered to the surface 203 of substrate 202. The pressure sensitive adhesive 206 overlies and is adhered to the surface 205 of the cured release coating composition layer 204. The second substrate 208 overlies and is adhered to the surface 207 of pressure sensitive adhesive layer 206. The release coating layer 204 is interposed between the first substrate 202 and the pressure sensitive adhesive 206, and is preferentially adhered to the first substrate 202. The pressure sensitive adhesive layer 206 is interposed between the release coating layer 204 and the second substrate 208, and is preferentially adhered to the second substrate 208.

The laminate structure depicted in FIG. 2 comprises the essential components of a pressure-sensitive label. The substrate 208 corresponds to the facestock of the label, and the substrate 202 corresponds to the release liner. This pressure-sensitive label could have an anti-block or ABC coating applied to surface 201 of substrate 202 to prevent adhesive, that may have migrated from under the label, from sticking to the substrate 202 when the label is unwound. A primer layer could be applied to the substrate 208 and be positioned between substrate 208 and adhesive layer 206. The primer layer could be used to increase facestock opacity, improve adhesive anchorage, prevent adhesive bleed or block plasticizer migration. Finally, a top coating could be applied to the surface 209 of substrate 208 for the purpose of improving or changing the surface properties of the label. The intent of the coating would be to develop a surface that is more receptive to printing inks or computer imprinting. In most cases the coating would be used to increase the ability of the ink to adhere to the surface thus preventing smearing or flaking of the image. The use of such antiblock coatings, primers and top coatings are well known in the art and need not be described further herein.

EXAMPLE 1–6

Moisture curable silicone release compositions are electrostatically sprayed on to paper substrates using an electrostatic spray rotary atomizer. The electrostatic spray atomizer is an Aerobell 33 electrostatic spray atomizer made by ITW Ransburg Industrial Liquid Systems of Toledo, Ohio. The bell used in the atomizer is a 57 mm, round edge, two piece bell. The bell is spun at 35,000 rpm and a voltage of 65 kV is used. The silicone release composition is sprayed on to the paper substrate which is affixed to a grounded cart moving at a rate of 50 feet per minute (fpm) under the atomizer. The atomizer is positioned 6–8 inches above the substrate. The following polyorganosiloxane polymers are used:

Polymer A—End blocked moisture curable alkoxy-functional polyorganosiloxane having a degree of polymerization of 100.

Polymer B—End blocked moisture curable alkoxy-functional polyorganosiloxane having a degree of polymerization of 200.

Polymer C—Moisture curable alkoxy-functional polyorganosiloxane having an average of 1.5 pendant groups and a degree of polymerization of 100.

The catalysts are:

Catalyst A—Fast cure organotin catalyst.

Catalyst B—Slower cure organotin catalyst.

For each test run the polymer and catalyst are premixed at a ratio of moles of polymer functional groups ($CH_3O$) to moles of functional catalysts groups (TiO) of 4.8:1. The substrate is 42.5# SCK (product of Nicolet Paper Co. identified as a super calandered kraft liner). The results are as follows:

|         |         |          | Coat Weight, gsm | | |
|---------|---------|----------|-------|-------|-------|
| Example | Polymer | Catalyst | Run 1 | Run 2 | Run 3 |
| 1 | A | A | 2.98 | 2.58 | 1.74 |
| 2 | B | A | 1.72 | 1.31 | 1.18 |
| 3 | C | B | 3.89 | 3.43 | 2.67 |
| 4 | A | B | 1.57 | 1.67 | 0.66 |
| 5 | B | B | 0.62 | 0.63 | 0.43 |
| 6 | A | B | 1.85 | 1.57 | 1.57 |

The 90° TLMI release results for each of the foregoing Examples is in the range of 100–500 grams/2 inch using Tesa 7475 (a product of Test Tape Inc. identified as an acrylic test tape).

EXAMPLES 7–10

The procedure used in Examples 1–6 is repeated except that thermally cured silicone release compositions are used. The silicone release compositions that are used are:

Silicone A—A thermal cure silicone release composition containing a mixture of a vinyl functional polyorganosiloxane polymer (>98% by weight), platinum catalyst (<1% by weight), and a maleate inhibitor (<1% by weight).

Silicone B—Silicone A with the addition of a conductivity additive at a concentration of 2% by weight.

Silicone C—Silicone A without the maleate inhibitor.

Dow Corning 7678 (identified as a methyl hydrogen copolymer cross linker) is blended with the foregoing Silicones A and B prior to spraying. Silicone C is mixed in situ with Dow Corning 7678 during the spraying process via two spray heads where the spray is intermeshed. The polymer systems and crosslinker are blended at a ratio of moles of vinyl (—C=C) in the polymer to moles of hydride (—H) in the cross linker of 1.65. The results are indicated below:

|         |          | Coat Weight, gsm | | |
|---------|----------|-------|-------|-------|
| Example | Silicone | Run 1 | Run 2 | Run 3 |
| 7  | A | 1.33 | 2.11 | 1.09 |
| 8  | A | 0.43 | 1.88 | 0.41 |
| 9  | B | 0.42 | 1.91 | 0.21 |
| 10 | C | 5.00 | 3.00 | 2.58 |

The 90° TLMI release results for each of Examples 7–10 is in the range of 100–200 grams/2 inch using Tesa 7475 test tape.

EXAMPLE 11

Laminate samples are made by electrostatically spraying a moisture curable release composition on a first paper substrate (release liner) followed by electrostatically spraying a pressure sensitive adhesive over the sprayed release composition. A second paper substrate (facestock) is placed over the pressure sensitive adhesive to form the desired laminate structures. The release composition is a moisture curable alkoxy functional release composition. The adhesive is PSA-5. The release composition and adhesive are sprayed using an Aerobell 33 electrostatic spray atomizer in sequence on to the first substrate which is affixed to a grounded moving cart moving under the atomizer at the rate indicated below. The adhesive is sprayed on to the sprayed release composition after the release composition is permitted to cure at room temperature. The spraying conditions are as follows:

|  | Release Composition | Adhesive |
|---|---|---|
| Bell spin rate, rpm | 35,000 | 35,000 |
| Voltage, kV | 95 | 65 |
| Cart movement rate, fpm | 50 | 50 |
| Spray height, inches | 6 | 6 |

The first substrate for each example is a 60# machine finished liner. The second substrate for each example is 50# DSX facestock (a product of Glatfelter Paper Co.). The 90° TLMI results for each sample is in the range of 150–500 grams per two inch using Tesa 7475 test tape.

EXAMPLE 12

Two adhesives are electrostatically sprayed on to a paper substrate using an Aerobell 33 electrostatic spray atomizer equipped with a 57 mm, round edge two-piece bell, and a grounded moving cart. The adhesives are PSA-4 and PSA-6. The following spray conditions are used:

| Bell spin rate, rpm | 20,000 |
|---|---|
| Voltage, kV | 60 |
| Cart movement rate, fpm | 45 |
| Spray height, inches | 8 |
| Fluid flow, cc/min. | 420 |

The coat weight of each sample is measured. Also, the loop tack force for each sample is measured. Loop tack is measured as the force resisting peeling of a tape at 90° from a surface upon which it has been applied using no external pressure to secure a more thorough contact. The results are as follows:

| Adhesive | Coat Weight, gsm | Loop Tack (Lb/inch) |
|---|---|---|
| PSA-4 | 37 | 5.1 |
| PSA-6 | 28 | 4.2 |

EXAMPLE 13

The test used in Example 12 is repeated except that the bell used with the atomizer is 30 mm, sharp edge bell with Micro-Channel serrations. Also, the adhesives used are PSA-6 and PSA-11. The following spray conditions are used:

| Bell spin rate, rpm | 20,000 |
|---|---|
| Voltage, kV | 60 |
| Cart movement rate, fpm | 45 |
| Spray height, inches | 8 |
| Fluid flow, cc/min. | 630 |

The results are as follows:

| Adhesive | Coat Weight, gsm | Loop Tack (lb/inch) |
|---|---|---|
| PSA-6 | 33 | 4.1 |
| PSA-11 | 25.4 | 1.6 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for applying a release coating material and a pressure sensitive adhesive coating material to a substrate, said substrate being the liner sheet of a release liner for a label, decal or tape, said liner sheet being comprised of paper, polymer film or a combination thereof, said process comprising:

(A) atomizing and electrically charging said release coating material;
   (B) spraying the atomized and electrically charged release coating material from step (A) on to said substrate which overlies a grounded support structure;
   (C) curing said release coating material;
   (D) atomizing and electrically charging said pressure sensitive adhesive coating material;
   (E) spraying the pressure sensitive adhesive coating material from step (D) on to the cured release coating material from step (C); and
   (F) placing another substrate over the sprayed pressure sensitive adhesive coating material from step (E).

2. The process of claim 1 wherein said pressure sensitive adhesive coating material comprises a rubber based adhesive, acrylic adhesive, vinyl ether adhesive, silicone adhesive or mixture of two of more thereof.

3. The process of claim 1 wherein the average particle size of the atomized release coating material and the atomized pressure sensitive adhesive coating material is in the range of about 40 to about 500 microns.

4. The process of claim 1 wherein the voltage used to electrically charge said release coating material and said pressure sensitive adhesive coating material is in the range of about 40 to about 100 kV.

5. The process of claim 1 wherein said release coating material and said pressure sensitive adhesive coating material are sprayed from an electrostatic spray apparatus, the gap between said spray apparatus and said substrate being about 4 to about 12 inches.

6. The process of claim 1 wherein said release coating material is a radiation-curable release coating composition.

7. The process of claim 6 wherein said release coating material further comprises a photoinitiator, said photoinitiator being a benzyl ketal, benzoin ether, acetophenone derivative, ketoxime ether, benzophenone, benzoxanthone or thioxantone.

8. The process of claim 1 wherein said release coating material is a silicone release coating composition.

9. The process of claim 1 wherein said release coating material is a moisture curable or thermally curable composition comprising at least one polyorganosiloxane and at least one catalyst.

10. A process for making a pressure sensitive label, decal or tape, comprising:

(A) atomizing and electrically charging a release coating composition;

(B) spraying the release coating composition from step (A) on to a liner sheet which overlies a grounded support structure;

(C) curing the sprayed release coating composition;

(D) atomizing and electrically charging a pressure sensitive adhesive composition;

(E) spraying the pressure sensitive adhesive composition from step (D) on said substrate over the cured release coating composition from step (C); and (F) placing a facestock over the sprayed adhesive composition from step (E), said liner sheet and said facestock independently being comprised of paper, polymer film or a combination thereof.

11. A process for applying a pressure sensitive adhesive to a substrate, said process comprising:

(A) atomizing and electrically charging said pressure sensitive adhesive; and (B) spraying the atomized and electrically charged pressure sensitive adhesive from step (A) on to said substrate which overlies a grounded support structure.

* * * * *